March 12, 1957 L. S. HODGES 2,784,658
TORSION BAR HITCH FRAME
Filed July 19, 1954 2 Sheets-Sheet 1

INVENTOR.
Leonard S. Hodges
BY James E. Nilles
Attorney

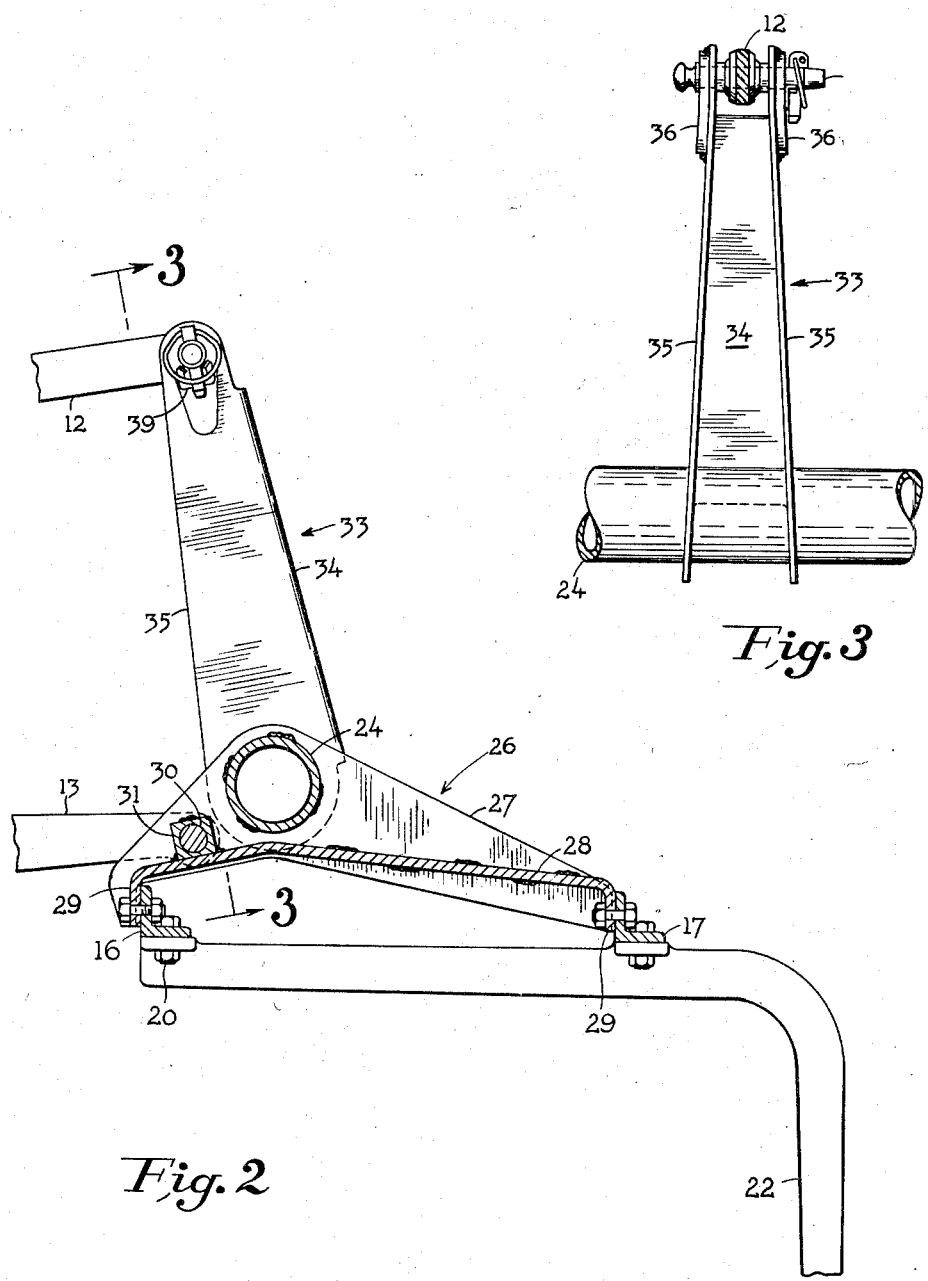

United States Patent Office 2,784,658
Patented Mar. 12, 1957

2,784,658

TORSION BAR HITCH FRAME

Leonard S. Hodges, Leamington Spa, England, assignor to Massey-Harris-Ferguson Inc., a corporation of Maryland Application July 19, 1954, Serial No. 444,257

Claims priority, application Great Britain July 30, 1953

9 Claims. (Cl. 97—47.62)

This invention relates to agricultural implements and in particular to tool carrying frames which are mounted transversely on a tractive vehicle. More specifically, this invention pertains to a hitch attaching frame for attaching a transverse tool frame to a three point hitch of a tractor.

It is known in this art to provide a soil working tool frame comprised of spaced transverse beams having fore-and-aft supports for the working tools. Such a frame usually has a front and rear inverted V frame attached to the front and rear transverse means, respectively, and are joined at their vertices where they are attached to the upper compression link of the well-known three point hitch. The two laterally spaced lower hitch links are secured adjacent the lower ends of the front inverted-V frame. In operation the soil resistance tends to rotate the implement frame about its pivotal connection with the lower hitch links, and this is resisted by the upper hitch link and by the rear inverted-V frame, whose members act as struts between the upper link and the rear transverse beam of the implement frame. The unsupported free lengths of the cross bars beyond the bases of the inverted-V frames are subjected to a twisting effect due to the soil pressure on the soil-working tools attached thereto. Although implements of this type have hitherto been satisfactory, it has been found that with wider implements having relatively greater free unsupported lengths and having more or larger tools at each side, such wider implements being designed for use with a tractor exerting a greater pull, the transverse bars are often permanently distorted, in spite of attempts to overcome this distortion by making the transverse bars of stronger angle section. As it is desirable to maintain a standard spacing of the three hitch attachment elements on the implement, the vertices of the inverted-V frame must remain at the same height. Moreover, the frame members could be extended outwardly only by splaying them apart at a greater inclination from the vertical, so much so that they would become less effective as struts. Thus, in effect, the proportion of free unsupported length of the beams increases with wider implements.

An object of the invention is to provide an improved implement construction which will reduce or obviate the above disadvantage.

Another object of the invention is to provide, for an implement of the type referred to, a hitch-attaching frame which comprises a transverse member, a plurality of laterally spaced fore-and-aft support arms, which are fixed to said transverse member and are adapted for attachment to a tool-carrying frame, and an upward arm which is fixed to said transverse member and is adapted for attachment at its upper end to a tractor top hitch link, said transverse member being of a cross-section adapted to resist torsion and bending and thus to reinforce the transverse beams of the tool-carrying frame. The hitch-attaching frame provides for attachment to the tractor lower hitch links.

The transverse member is preferably of substantial length and has support arms at its extremities so as to minimize the free unsupported length of the transverse beams of the tool-carrying frame.

Other objects and advantages will become apparent as this disclosure progresses, reference being had to the accompanying drawings in which:

Fig. 2 is an elevational view, on an enlarged scale, taken on line 2—2 of Figure 1.

Fig. 3 is a detail view taken on line 3—3 of Figure 2.

Figure 1:
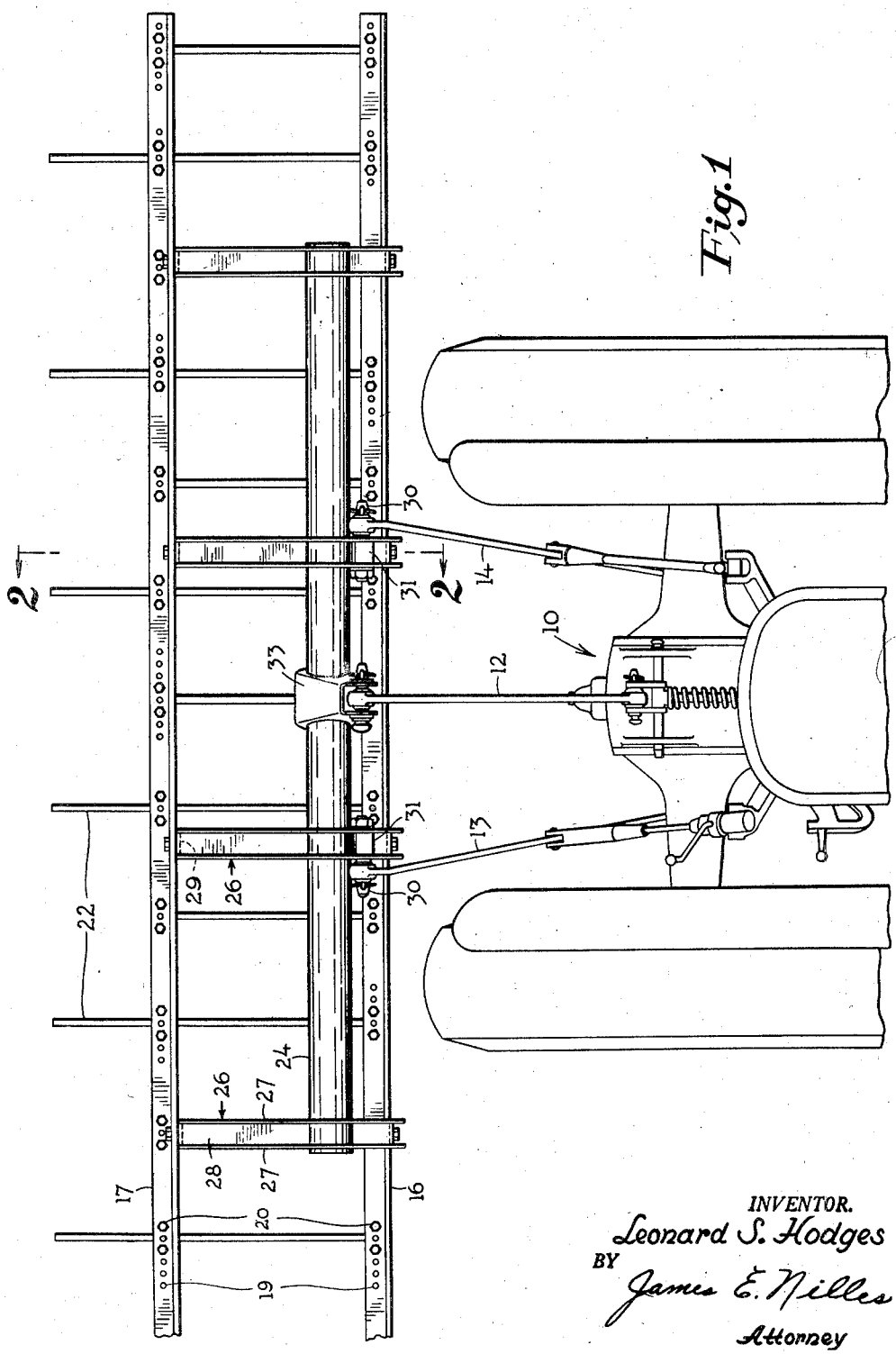
Fig. 1 is a plan view of the hitch-attaching frame in accordance with the invention.

The tractor to which this implement is attached for illustrative purposes is the well-known Ferguson tractor designated generally by the numeral 10 and has the conventional upper compression link 12 and the lower laterally spaced tension links 13, 14.

The tool-carrying frame consists of two fore-and-aft spaced transverse angle-section bars 16, 17 having series of apertures 19 for the attachment by bolts 20 of any required number of supports 22 in any desired transverse spacing. The supports 22 may be formed with or carry any desired soil-engaging tools, for example cultivating tines. Thus, the bars 16, 17 and the supports 22 form a transverse tool frame.

The hitch-attaching frame includes a transverse torsion-resisting member shown here in the form of a steel tube 24 of substantial diameter and extending to substantially near the ends of the tool frame 16, 17, 22. The hitch-attaching frame also includes laterally spaced fore-and-aft arms 26, which are fixed intermediate their length to the tube 24. Each arm 26 consists of two side plates 27 inter-connected by a web plate 28, which is welded to the plates 27 and is turned down at its ends to form flanges 29. The flanges have holes to receive bolts for the attachment of the bars 16, 17. The plates 27 are apertured to fit on to the tube 24 to which they are welded. The arms 26 so formed are especially rigid and transmit any twisting stresses of the tool frame directly to the tube 24 without any buckling or bending. Furthermore by fastening the side plates 27 to the tube in this manner, the torsional stresses are transmitted to the tube evenly around the periphery thereof. The tube 24 is located in a fore and aft direction, between the bars 16, 17 and thereby the twisting moments of the arms 26, 27 are minimized.

Attachment pins 30 for attachment to the lower hitch links 13, 14 are provided at the front ends of the two inner arms 26, being bolted through blocks 31 welded between the side plates 27.

The hitch-attaching frame also includes an upward arm 33 which is fixed to the middle of the tube 24 and forms the connection between the tube 24 and the top hitch link 12. This arm consists of a plate 33 bent into a tapering U-cross-section formed by a rear portion 34 and side flanges 35, the latter being apertured to fit on to the tube 24, to which they are welded. At the top end, the flanges 35 are apertured and have welded to them apertured reinforcing plates 36, which are adapted to receive a hitch pin 38 for connecting the arm with the top hitch link 12. On one of the plates 36 there is provided a two-pronged bracket 39, which is adapted to receive the usual cotter pin for securing the hitch pin 38 against rotation.

In use of the implement, the soil resistance exerts a rearward reactive force, which force strives to rotate the implement anti-clockwise around the lower hitch pins 30, and this is resisted by the top link 12 at the pin 38. The reactive force is transmitted through the tool frame (bars 16, 17 and supports 22) to the arms 26 and thence to the tube 24 and upward arm 33. Owing to the tube being of substantial diameter, it effectively resists any appreciable torsional deflection and thus in association with the arms 26 and 33 it provides a rigid support to the tool frame 16, 17, 22 to the extent of the outermost arms 26. As the free length of the bars 16, 17 beyond the arms 26 is relatively short, they are thus effectively braced against distortion, especially upward bending of the rear bar 17. In addition to torsional stresses, the tube 24 is also subjected to bending stresses and these it also effectively resists owing to its substantial diameter.

As Fig. 2 shows, the arms 26 are secured to the tool frame bars 16, 17 in such a manner that they are clear of the supports 22 of the soil-working tools. Thus, the farm worker is free to set these supports at any desired spacing without interference from the arms 26 and their securing means.

In one example, a welded mild steel tube of about 3.5 inch outside diameter and 0.212" "standard wire gauge" in thickness has been found suitable. This tension-resisting member 24 may be of cross-sectional forms other than circular.

Having thus shown and described this invention what is desired to be secured by Letters Patent is:

1. An implement frame adapted to be attached to and carried by a tractor comprising; a tool frame positioned transversely of said tractor and having front and rear transverse bars; a hitch attaching frame comprising, a torsion-resisting member positioned above and parallel to said tool frame and between said bars in a fore and aft direction, laterally spaced fore and aft arms secured intermediate their length to said member and rigidly secured to said front and rear bars at spaced locations intermediate the length of the latter, an upstanding arm secured to said member and adapted to be detachably secured to an upper hitch link of a tractor, said hitch attaching frame having means on some of said fore and aft arms for detachable connection to lower spaced hitch links of a tractor.

2. A device as recited in claim 1 further characterized in that said fore and aft arms comprise; vertically positioned spaced parallel side plates each having an aperture for the reception of said member, a web plate positioned between said side plates and rigidly secured thereto.

3. An implement frame adapted to be attached to and carried by a tractor comprising; a tool frame positioned transversely of said tractor and having front and rear transverse bars; a hitch attaching frame comprising, a torsion-resisting member positioned above and in parallelism with said tool frame and between said bars in a fore and aft direction, laterally spaced fore and aft arms secured intermediate their length to said member and also rigidly secured to said tool frame at spaced locations intermediate the length of the latter, an upwardly extending arm rigidly secured to said member and having means adjacent its upper end adapted to connect it with an upper hitch link of a tractor, said implement frame also having laterally spaced means on some of said fore and aft arms adapted to connect it with lower laterally spaced hitch links of a tractor.

4. An implement having a tool frame comprising a pair of elongated substantially parallel spaced rigid bars disposed in a substantially horizontal plane and adapted to be moved over the ground in a direction substantially perpendicular to the longitudinal axes of the bars, the bars being adapted to carry a plurality of downwardly extending ground engaging tools longitudinally adjustable therealong; a hitch attaching frame comprising, a torsion-resisting member disposed above said tool frame and parallel thereto and between said bars in a fore and aft direction, fore and aft arms secured to said member along the length thereof and rigidly secured to said bars at spaced locations intermediate the length of the latter, an upstanding arm secured to said member and having means adapted to connect it to an upper hitch link of a tractor, means on some of said fore and aft arms adapted to connect said frame to spaced lower hitch links of a tractor.

5. A hitch attaching frame for use in moving a pair of spaced parallel implement carrying bars, disposed one behind the other, over the ground perpendicular to their longitudinal axes and behind a lower pair of spaced hitch links and one upper hitch link, said frame comprising; a torsion-resisting member disposed above and between and in parallel relation to said bars, fore and aft positioned arms rigidly secured to said bars at spaced locations intermediate the length of the latter, an upwardly extending arm secured to said member and having means adapted to be attached to said upper hitch link, means on some of said fore and aft arms adapted to be attached to said lower hitch links.

6. A device as recited in claim 5 further characterized in that said fore and aft arms comprise; vertically positioned spaced parallel side plates each having an aperture for the reception of said member, a web plate positioned between said side plates and rigidly secured thereto.

7. A device according to claim 5 further defined in that said member is a tube of circular cross section.

8. In an implement frame of the type having a tool frame comprising front and rear spaced bars adapted to be moved transversely over the ground in a direction perpendicular to the longitudinal axis of said bars by a pair of lower laterally spaced hitch links and an upper hitch link of a tractor, the improvement comprising; a hitch attaching frame for securing said tool frame to said links comprising, a torsion-resisting member positioned above and between and parallel to said tool frame, fore and aft arranged arms laterally spaced along said member and rigidly secured thereto, said arms also rigidly secured to said front and rear bars at spaced locations intermediate the length of said bars, an upstanding arm rigidly secured to said member and having means adapted to connect it with said upper hitch link, said hitch attaching frame also having spaced means secured to some of said fore and aft arms adapted for connection to said lower spaced hitch links.

9. A device as defined in claim 8 further characterized in that said member is a tube of round cross section.

References Cited in the file of this patent

UNITED STATES PATENTS

| 2,562,486 | Denning | July 31, 1951 |
| 2,645,989 | Prince | July 21, 1953 |
| 2,655,854 | Warne | Oct. 20, 1953 |
| 2,722,876 | London | Nov. 8, 1955 |